US006971102B2

(12) United States Patent
Kawachiya et al.

(10) Patent No.: US 6,971,102 B2
(45) Date of Patent: Nov. 29, 2005

(54) COMPUTER SYSTEM, MEMORY MANAGEMENT METHOD, STORAGE MEDIUM AND PROGRAM TRANSMISSION APPARATUS

(75) Inventors: Kiyokuni Kawachiya, Kanagawa (JP); Tamiya Onodera, Ageo (JP)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 09/803,168

(22) Filed: Mar. 9, 2001

(65) Prior Publication Data

US 2001/0025295 A1 Sep. 27, 2001

(30) Foreign Application Priority Data

Mar. 9, 2000 (JP) .............................. 2000-064718

(51) Int. Cl.[7] ................................................ G06F 9/00
(52) U.S. Cl. ........................ 718/104; 710/200; 707/206
(58) Field of Search ......................... 709/1–108, 315; 710/200; 711/147–173; 718/1, 100, 107, 718/104; 707/206

(56) References Cited

U.S. PATENT DOCUMENTS

| | | | | |
|---|---|---|---|---|
| 5,652,883 | A | * | 7/1997 | Adcock ...................... 707/206 |
| 5,761,670 | A | * | 6/1998 | Joy ......................... 707/103 R |
| 5,845,129 | A | * | 12/1998 | Wendorf et al. ............ 710/200 |
| 5,862,376 | A | * | 1/1999 | Steele et al. ................. 709/107 |
| 6,209,066 | B1 | * | 3/2001 | Holzle et al. ................ 711/153 |
| 6,304,949 | B1 | * | 10/2001 | Houlsdworth ................ 711/170 |
| 6,487,652 | B1 | * | 11/2002 | Gomes et al. ................. 712/23 |
| 6,772,153 | B1 | * | 8/2004 | Bacon et al. .................... 707/8 |

FOREIGN PATENT DOCUMENTS

| | | | |
|---|---|---|---|
| JP | 62-221749 | 9/1987 | ........... G06F 12/02 |
| JP | 04-205638 | 7/1992 | ........... G06F 13/00 |
| JP | 08-006805 | 1/1996 | ............. G06F 9/46 |
| JP | 08-223556 | 8/1996 | .......... H04N 7/173 |
| JP | 11-212808 | 8/1999 | ............. G06F 9/46 |

OTHER PUBLICATIONS

Onodera, T. "Generational and Conservative Copying Collector for C-Based Objects" IBM Research, Tokyo Research Laboratory, IPSJ, vol. 92, No. 75, pp 33-41, Sep. 22, 1992.
Kamada, T. et al. "Efficient Global Garbage Collection on a Massively Parallel Computer" Dept. Of Information Science, The University of Tokyo, IPSJ, vol. 93, No. 73, pp. 121-128, Aug. 20, 1993.
Onodera, T. "Introduction to Conservative Collection", IBM Japan, Tokyo Research Laboratory, IPS, vol. 35, No., pp 1020-1026, Nov., 1994.

* cited by examiner

Primary Examiner—St. John Courtenay, III
Assistant Examiner—Phuong N. Hoang
(74) Attorney, Agent, or Firm—Gregory M. Doudnikoff; Dillon & Yudell LLP (57) ABSTRACT

The present invention provides a technique for skipping a locking process for an object in memory when a thread accesses an object that only it will access in order to reduce the load imposed on a system and to improve the overall system performance. A program executing in a computer system has multiple threads that share and access objects stored in memory. The objects have thread locality flags associated therewith that indicate the presence or absence of thread localities. The threads examine the thread locality flags for the objects they attempt to access to determine whether the corresponding objects, which are to be accessed, have localities for the threads. If, so the, threads skip the locking process and access objects immediately. If not, the object is locked prior to being accessed.

9 Claims, 6 Drawing Sheets

COMPUTER SYSTEM, MEMORY MANAGEMENT METHOD, STORAGE MEDIUM AND PROGRAM TRANSMISSION APPARATUS

BACKGROUND OF THE INVENTION

1. Field of the Invention

The present invention relates to a computer system that provides a data processing environment in which a program is executed as multiple threads. More particularly, the present invention relates to a system in which the threads share and access data that is stored in a memory device.

2. Description of the Related Art

In a data processing environment, a program may be executed as multiple threads, and the individual threads access shared data. In this type of processing environment, when a specific thread accesses specific data, a locking process is performed that inhibits the use of the data by other threads. Therefore, when a first thread needs to access data that is being employed by a second thread, the data is locked, and the first thread must wait for the data to be unlocked.

In this processing environment, data may also be present that is accessed only by a specific thread. However, even when the specific thread accesses such data, the locking process is conventionally performed relative to that data. That is, even when the probability is practically nil that other threads will seek to access the data in question, the locking process will still be performed, even though there is no need.

In addition, in such a processing environment, data that will no longer be accessed by any thread is retained in a storage area on a data storage device. Thus, the available storage area space may be considerably reduced. Therefore, as needed, to increase the available storage area space, garbage collection is performed to collectively remove data that are no longer necessary.

Conventional methods exists that are employed for garbage collection for programs executed as threads. One method temporarily halts the execution of a program while data that are no longer being accessed are searched for and removed from the storage area. Another method performs parallel processing during the execution of a program to determine which data are being accessed in order to select and remove data that are no longer necessary.

An example data processing environment is the operating environment for a program written in the Java language (hereinafter referred to as the Java operating environment). Java is a trademark of Sun Microsystems, Inc. In the Java language, when the threads of a program access objects that are created in a designated object pool in the storage area of a memory device, all the processes are performed. Therefore, in the Java operating environment, locking processes and garbage collection are frequently performed.

Thus, a demand exists for a high speed locking process and for a technique for reducing the required garbage collection time.

As is described above, in a data processing environment wherein multiple threads access shared data (objects), there are data that can be accessed only by one specific thread. Even when a thread accesses data for which the probability is practically nil that it will be accessed by other threads, an unnecessary locking process is performed, uselessly. As a result, the overall performance of the system is deteriorated.

According to one of the garbage collection methods, a program being executed as threads is temporarily halted to remove unnecessary data, and all the other processes of the system must be halted. In this case the usability for a user is very unsatisfactory.

According to another prior art technique, unnecessary data are removed while a program being executed as threads continues to run, and the data are searched for and removed during the operation. The result is that, for a user, the overall performance of the system is degraded.

SUMMARY OF THE INVENTION

It is, therefore, one object of the present invention to skip the locking process for data that is to be accessed by one specific thread and for which the probability is practically nil that it will be accessed by other threads, so that the load imposed on the system can be reduced and the overall performance of the system improved.

Another object of the present invention is to enhance the efficiency of the garbage collection process performed in parallel to normal processing, so that the deterioration of the overall performance of the system is reduced.

To achieve the above objects, according to the present invention, a computer system is provided having a data processing environment in which a program is executed as multiple threads, and in which the threads share and access data that is stored in a memory device, wherein the data stored in the memory device have flag data indicating a locality for specific data that will be accessed only by a specific thread, wherein when the flag data indicate the locality for the specific data, a locking process, to reject access attempts by other threads, is not performed by the specific thread before accessing the specific data, and wherein, when the flag data do not indicate the locality for the specific data, the specific thread performs the locking process before accessing the data.

Since the locking process is not required when data is accessed for which a locality is indicated for a specific thread, the load imposed on the specific thread can be reduced, and the overall performance of the system can be improved.

The specific thread detects data, included in the data stored in the memory device, indicating that the flag data has a locality but the specific thread does not have a reference pointer to the data, and thereafter releases the area occupied by the data to provide storage space that is freely available.

This arrangement is preferable because a predetermined thread can locally erase data that it does not refer to and release the data area to provide additional storage space, and thus normal processing can be performed in parallel by the other threads, without their being halted.

According to the present invention, a computer system is provided having a data processing environment in which multiple threads share and access objects, wherein flag data is provided for an object indicating the existence of a locality specifying the object is to be accessed only by a specific thread; wherein, when the flag data for the object indicates the locality for the specific thread, the specific thread does not perform a locking process, to reject access attempts by other threads or other objects, before accessing the specific data, and wherein, when the flag data does not indicate the locality for the specific thread, the specific thread performs the locking process before accessing the object.

When the object is created by a thread, the flag data of the object is set to indicate a locality exists for the thread. And before the object is changed so that it can be accessed by another thread or another object, the locality indicated by the flag data is canceled. Specifically, initially each object represents the existence of a locality for one of the threads, but when a predetermined condition is present, the locality is canceled in accordance with a state change concerning access by the pertinent thread. It should be noted that when an object's reference is substituted into another object, or into global data, the thread can detect the occurrence of a condition whereby the state of object should be changed. Further, at this time the locality may be canceled by performing a complete examination to determine whether a locality exists in object into which the substitution is made.

The specific thread detects an object for which the flag data indicates the existence of a locality for the specific thread but the specific thread does not have a reference pointer to the object, and thereafter releases the object to provide in a memory device storage space that is freely available.

According to the present invention, a memory management method for a data processing environment in which a program is executed as multiple threads, and in which the threads share and access objects that are stored in a memory device, comprises the steps of setting flag data indicating the existence of a locality for a specific object that is created by a specific thread and that is to be accessed only by the specific thread; canceling the locality indicated by the flag data before the specific object is changed so that the specific object can be accessed by another thread; not performing a locking process, to reject access attempts by other threads or objects, before accessing the specific object when the flag data for the specific object indicates the existence of a locality for the specific thread; and performing the locking process before accessing the specific object when the flag data indicates the absence of a locality for the specific thread. Since the locking process is not required when accessing an object for which a locality exists for a specific thread, the overall performance of the system can be improved.

The step of canceling the locality indicated by the flag data for the specific object includes a step of: performing the locking process, when the specific object has a locality for a predetermined thread, that was skipped at the time the specific object was accessed by the predetermined thread. This arrangement is necessary because when the locality is canceled for a predetermined object, the locking status must be made consistent in advance. The fact that the locking process was skipped must be verified in order for it to be performed later. For this verification, the execution stack for the thread or a count that is kept of the number of times the locking process was skipped can be referred to.

According to the present invention, a memory management method for a data processing environment in which a program is executed as multiple threads, and in which the threads share and access objects that are stored in a memory device, comprises the steps of: setting flag data indicating the existence of a locality indicating that a specific object that is created by a specific thread is to be accessed only by the specific thread; permitting the specific thread to detect an object for which flag data indicates the existence of a locality for the specific thread and the specific thread does not have a reference pointer to the object; and unlocking the detected object to provide in a memory device storage space that is freely used. This arrangement is preferable because since garbage collection can be locally performed by a predetermined thread, it is not necessary to halt parallel, normal processing that is being performed by other threads.

According to the present invention, provided is a storage medium on which input means for a computer stores a computer-readable program, which permits the computer to perform: a process for setting flag data indicating the existence of a locality for a specific object that is created by a specific thread and that is to be accessed only by the specific thread; a process for canceling the locality indicated by the flag data before the specific object is changed so that the specific object can be accessed by another thread; a process for not performing a locking process, to reject access attempts by other threads or objects, before accessing the specific object when the flag data for the specific object indicates the existence of a locality for the specific thread; and a process for performing the locking process before accessing the specific object when the flag data indicates the absence of a locality for the specific thread. With this arrangement, for all computers that install this program, a locking process is not required when an object is accessed for which a locality exists for a specific thread, and thus, the overall performance of the system can be improved.

According to the present invention, provided is a storage medium on which input means for a computer stores a computer-readable program, which permits the computer to perform: a process for setting flag data indicating the existence of a locality indicating that a specific object that is created by a specific thread is to be accessed only by the specific thread; a process for permitting the specific thread to detect an object for which flag data indicates the existence of a locality for the specific thread and the specific thread does not have a reference pointer to the object; and a process for unlocking the detected object to provide in a memory device storage space that is freely used. With this arrangement, for all computers that install this program, garbage collection can be locally performed by a predetermined thread, and it is not necessary to halt parallel, normal processing that is being performed by other threads.

According to the present invention, a program transmission means comprises storage means for storing a program that permits a computer to perform a process for setting flag data indicating the existence of a locality for a specific object that is created by a specific thread and that is to be accessed only by the specific thread, a process for canceling the locality indicated by the flag data before the specific object is changed so that the specific object can be accessed by another thread, a process for not performing a locking process, to reject access attempts by other threads or objects, before accessing the specific object when the flag data for the specific object indicates the existence of a locality for the specific thread, and a process for performing the locking process before accessing the specific object when the flag data indicates the absence of a locality for the specific thread; and transmission means for reading the program from the storage means and for transmitting the program. With this arrangement, for all computers that download and execute this program, the locking process is not required when an object is accessed for which a locality exists for a specific thread, and the overall performance of the system can be improved.

According to the present invention, a program transmission means comprises storage means for storing a program that permits a computer to perform a process for setting flag data indicating the existence of a locality indicating that a specific object that is created by a specific thread is to be accessed only by the specific thread, a process for permitting the specific thread to detect an object for which flag data indicates the existence of a locality for the specific thread and the specific thread does not have a reference pointer to the object, and a process for unlocking the detected object to provide in a memory device storage space that is freely used; and transmission means for reading the program from the storage means and for transmitting the program. With this arrangement, for all computers that download and execute this program, garbage collection can be locally performed by a predetermined thread, and it is not necessary to halt parallel, normal processing that is being performed by other threads.

The present invention will now be described in detail while referring to the preferred embodiment shown in the accompanying drawings.

DESCRIPTION OF THE PREFERRED EMBODIMENT

Figure 1:
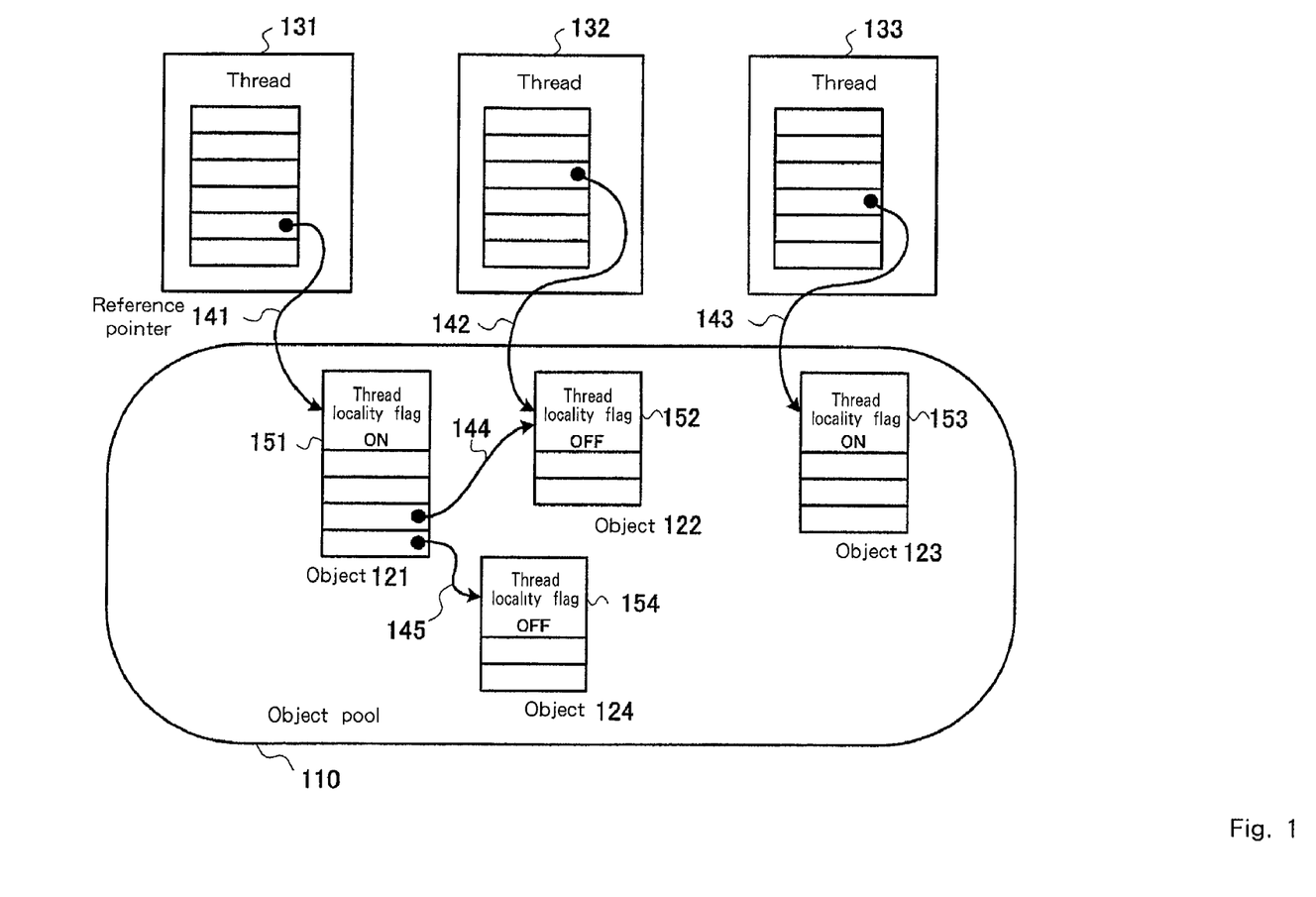
FIG. 1 is a diagram for explaining the general arrangement of a computer system that carries out memory management in accordance with one embodiment of the present invention.

FIG. 1 is a diagram showing the general arrangement of a computer system that carries out memory management in accordance with the embodiment. The computer system in this embodiment has a data processing environment wherein a program is executed as multiple threads, and the threads share and access objects stored in a memory device. In the following explanation, a computer system is employed that has as an operating environment a program written in the Java language (hereinafter referred to as a Java operating environment).

In FIG. 1, an object pool 110 is a storage area in a memory device in which objects 121 to 124 are stored. A reference pointer 141 is from a thread 131 to object 121; a reference pointer 142 is from a thread 132 to object thread 122; a reference pointer 143 is from a thread 133 to object 123; a reference pointer 144 is from object 121 to object 122; and a reference pointer 145 is from object 121 to object 124. Thread locality flags 151 to 154 are respectively provided for objects 121 to 124.

In a normal operation, as needed, threads 131 to 133 create and employ objects in the object pool 110. In FIG. 1, thread 131 refers to object 121, and also refers to objects 122 and 124 via object 121. Similarly, thread 132 refers to object 122, and thread 133 refers to object 123. When this state is viewed from the objects, object 121 is directly referred to only by thread 131. Object 122 is directly referred to by thread 132, and by thread 131 via object 121. Object 123 is referred to only by thread 133 directly, and object 124 is referred to only by thread 131 via object 121.

In the following explanation, the state wherein the object is referred to directly by only one thread is called an existence of a thread locality.

Specifically, in FIG. 1, thread localities exist in object 121 that is directly referred to only by thread 131 and in object 123 that is directly referred to only by thread 133. Although object 124 is referred to only by thread 131 via object 121, the embodiment consider that a thread locality does not exist in object 124. A thread locality does not exist in an object, such as object 124, that is referred to via a specific object, because a complicated process is required to determine whether the pertinent object is referred to actually only by one thread, or by multiple threads via other objects.

Objects 121, 122, 123 and 124 are respectively provided with thread locality flags 151, 152, 153 and 154 indicating each object has a thread locality. In this embodiment, when objects 121, 122, 123 and 124 have thread localities, the thread locality flags 151, 152, 153 and 154 are set ON, while, when objects 121, 122, 123 and 124 do not have thread localities, the thread locality flags 151, 152, 153 and 154 are set OFF.

When threads 131, 132 and 133 create objects, they set the thread localities of the objects ON. Before the created objects are changed by threads 131, 132 and 133 so that they can be referred to by other threads or other objects, the thread localities of these objects are set OFF. Various methods can be employed by threads 131, 132 and 133 to detect the occurrence of a condition where an object having a thread locality for a local thread should be changed so that it can be referred to by other threads or other objects. For example, when a reference to a specific object is substituted into another object or global data, the state can be changed. At this time, the locality flag may be released by performing a complete examination to determine whether an object into which the specific object is substituted is local.

Once a thread locality flag is set OFF, it is not set ON again. Actually, there are some cases where an object having a thread locality for a specific thread is temporarily referred to by another thread, and the reference pointer is then erased and the thread locality is again recovered. However, if this case is also taken into account, the process performed to determine a thread locality becomes complicated, and thus the thread locality flag is maintained OFF.

Figure 2:
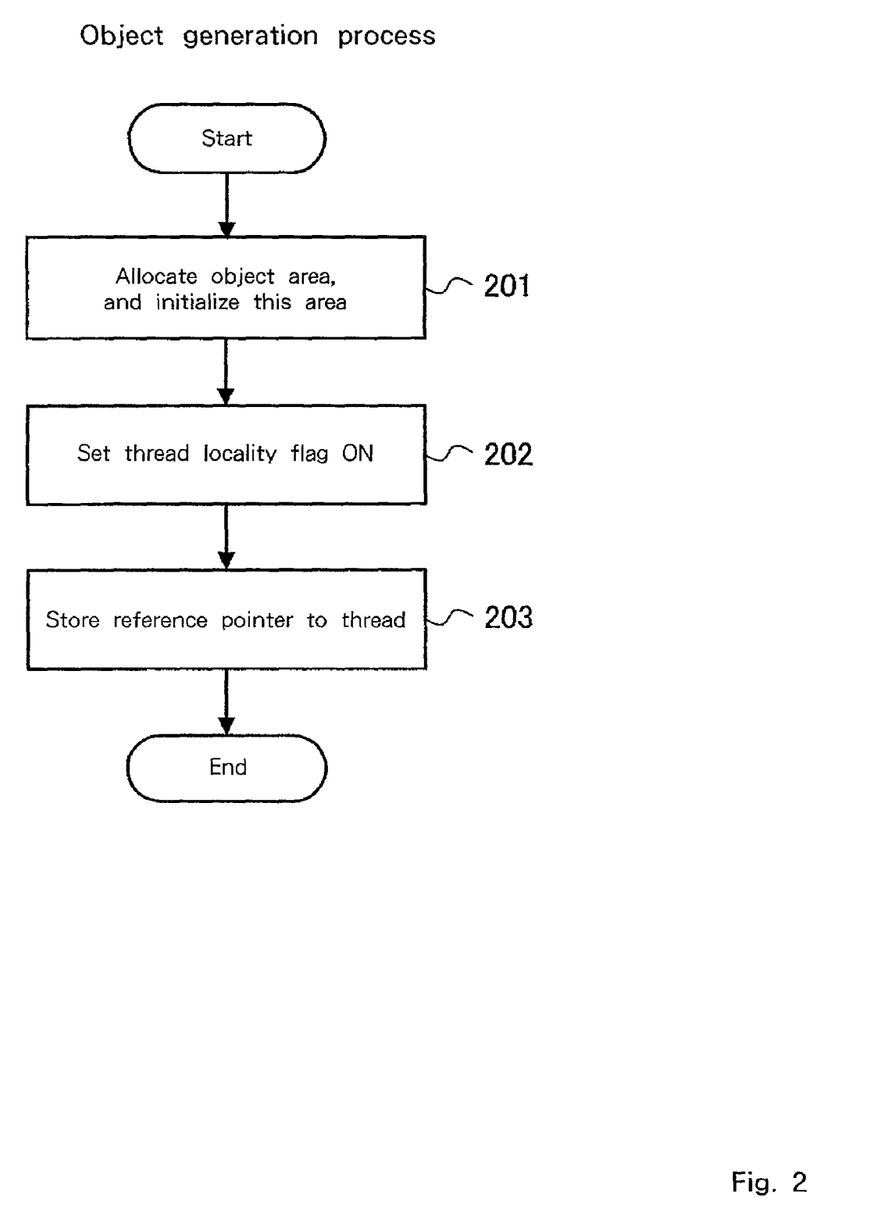
FIG. 2 is a flowchart for explaining the processing performed in accordance with the embodiment when a thread creates an object.

FIG. 2 is a flowchart for explaining the processing performed during which threads 131, 132 and 133 create objects 121, 122 and 123. In FIG. 2, first, threads 131, 132 and 133 obtain areas in the object pool 110 as object areas, and initialize these areas (Step 201). Then, the thread locality flags 151, 152 and 153 are allocated to the object areas and are set ON (Step 202). Following this, reference pointers to objects 121, 122 and 123 are stored in threads 131, 132 and 133 (Step 203).

When objects 121, 122 and 123 are created, all the thread locality flags 151, 152 and 153 are ON. In FIG. 1, object 122 thereafter loses the thread locality, and the thread locality flag 152 is set OFF. It should be noted that in the example in FIG. 1, object 122 can be referred to by object 121. Further, in FIG. 1, object 124, which is created by one of threads 131, 132 and 133 loses thread locality, and the thread locality flag 154 is set OFF. Thereafter, object 124 is changed so that it can be referred to by object 121, and then the other reference pointer is erased, so that object 124 can now to be referred to only by object 121.

In a data processing environment, such as Java, where multiple threads share and access objects, when a specific thread is referring to a specific object, other threads should be inhibited from referring to this object. Thus, when each thread refers to the object, it performs a locking process to reject attempts by other threads to access this object. And when the locking process is employed, a thread whose access attempt was rejected must wait until the specific object is unlocked to refer to it.

However, in this embodiment the thread that refers to the object having the thread locality is limited to only one thread. Therefore, when a thread refers to an object having the thread locality for the pertinent thread, the locking process need not be performed.

Figure 3:
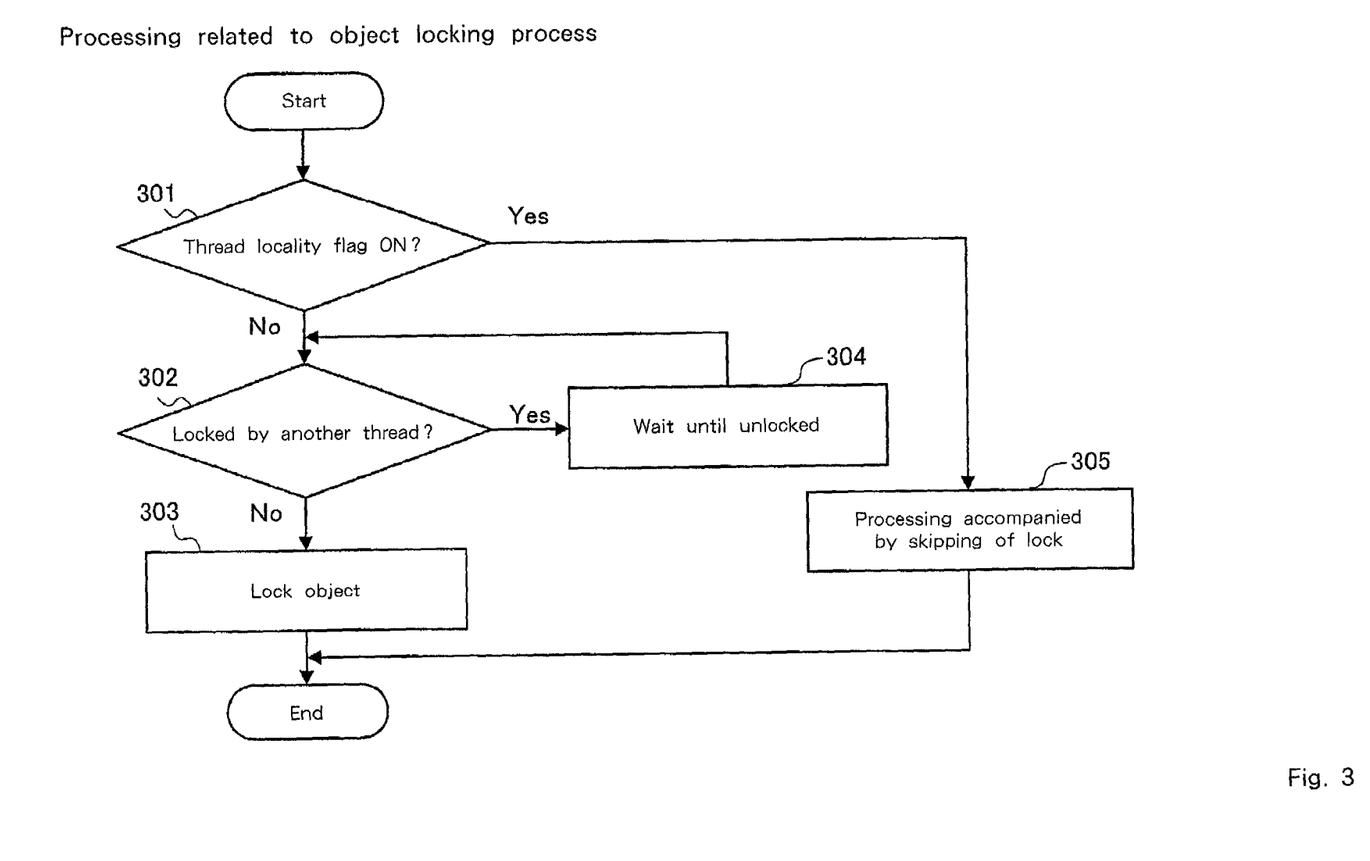
FIG. 3 is a flowchart for explaining the processing related to the locking process performed in accordance with the embodiment when the thread refers to the object.

FIG. 3 is a flowchart for explaining the operation concerning the locking process that is performed when threads 131, 132 and 133 refer to objects 121, 122, 123 and 124. In FIG. 3, first, threads 131, 132 and 133 determine whether the thread locality flags 151, 152, 153 and 154 of objects 121, 122, 123 and 124 are ON (Step 301). When the thread locality flags 151 to 154 are ON, threads 131 to 133 refer to objects 121 to 124 without performing the following process. At this time, the processing accompanied by the skipping of the locking process is performed as needed (Step 305). This case corresponds to thread 131 referring to object 121 and thread 133 referring to object 123. The processing that accompanies the skipping of the locking process will be described later.

When the thread locality flags 151 to 154 are OFF, the locking process is performed normally. That is, thread 131, 132 or 133, which refers to object 121, 122, 123 or 124, determines whether the pertinent object has been locked by another thread 131, 132 or 133 (Step 302). When object 121, 122, 123 or 124 has been locked, thread 131, 132 or 133 waits until this object is unlocked (Step 304). When object 121, 122, 123 or 124 has not been locked by another thread 131, 132 or 133 (including a case where it has been unlocked), the locking process is performed for the pertinent object (Step 303), and the object is referred to. This case corresponds to when thread 132 refers to object 122, and when thread 131 refers to object 122 or 124 via object 121.

In this embodiment, the thread does not perform the locking process when it refers to the object. The unlocking process that is to be performed after the object is referred to is also not required.

Figure 4:
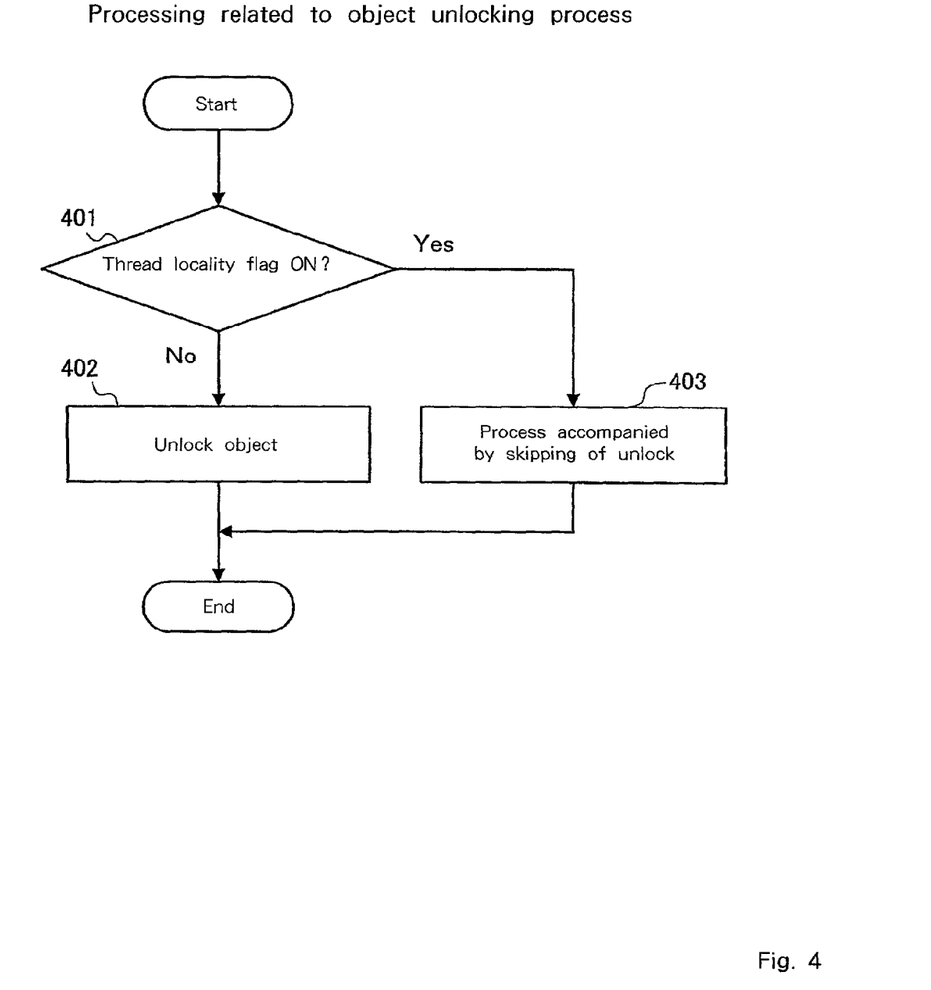
FIG. 4 is a flowchart for explaining the processing related to the unlocking process performed in accordance with the embodiment when the thread has referred to the object.

FIG. 4 is a flowchart for explaining the operation concerning the unlocking process to be performed when threads 131 to 133 have referred to objects 121 to 124. In FIG. 4, first thread 131, 132 or 133 determines whether the setting for the thread locality flag 151, 152, 153 or 154 of object 121, 122, 123 or 124 that has been referred to is ON (Step 401). When the setting for the thread locality flag 151, 152, 153 or 154 is ON, the reference to the pertinent object is terminated without performing the following processing. At this time, the accompanying processing is performed, as needed, that is performed when the unlocking process is not required (Step 403). In the same manner as when the locking process is skipped, this case corresponds to thread 131 referring to object 121 and to thread 133 referring to object 123.

When the thread locality flag 151, 152, 153 or 154 is OFF, the unlocking process is performed normally (Step 402).

Figure 5:
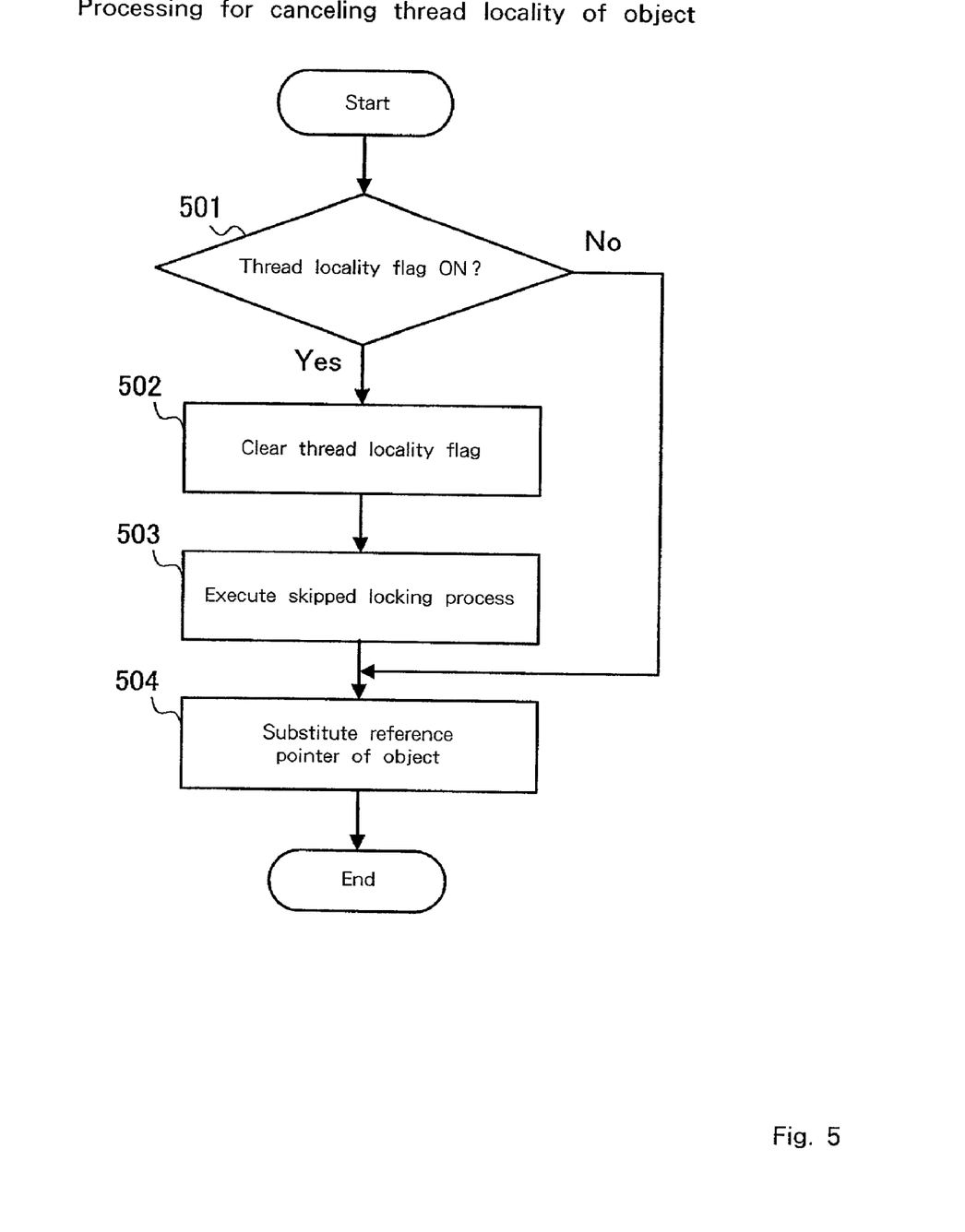
FIG. 5 is a flowchart for explaining the processing in accordance with the embodiment for canceling the thread locality for a specific thread that exists in an object.

An explanation will now be given for an operation wherein an object, such as object 121 or 123, whose thread locality flag is ON and which that has the thread locality for a specific thread, is changed so that it can be referred to by another thread or another object. FIG. 5 is a flowchart for explaining this operation.

Assume that thread 131, 132 or 133 detects the occurrence of a condition wherein object 121, 122, 123 or 124, which has a thread locality for a pertinent thread, should be changed so that it can be referred to by another thread or another object. As is described above, various methods can be employed to detect such a condition. In this embodiment, when a reference to a pertinent object is substituted into another object or global data, it is ascertained that a condition has occurred wherein the state of the object should be changed.

In this case, first, thread 131, 132 or 133 determines whether the setting for the thread locality flag 151, 152, 153 or 154 of object 121, 122, 123 or 124 that is to be accessed is ON (Step 501). If the thread locality flag 151, 152, 153 or 154 is OFF, no special process is performed, and the reference pointer of object 121, 122, 123 or 124 is substituted into another object or data (Step 504). This case corresponds to substitution of object 122 or 124 into another object or global data.

When the setting for the thread locality flag 151, 152, 153 or 154 is ON, thread 131, 132 or 133 instructs object 121, 122, 123 or 124 to set the thread locality flag 151, 152, 153 or 154 to OFF. Upon the receipt of the instruction, object 121, 122, 123 or 124 sets the corresponding thread locality flag 151, 152, 153 or 154 to OFF (Step 502). Thus, the thread locality for object 121, 122, 123 or 124 is lost, and the following accompanying processing must be performed.

Assume that the thread locality of object 123 for thread 133 is to be canceled. When the thread locality of object 123 is canceled, thread 132 and other objects must lock object 123 if they access it. And if object 123 is locked by thread 133, thread 132 must wait until it has been unlocked. However, since object 123 will maintain the thread locality for thread 133 until thread 132 refers to it, the locking process and the unlocking process were skipped when thread 133 referred to object 123. Therefore, before thread 132 can refer to object 123, the locking process and the unlocking process that were skipped must be performed to provide matching processes.

Therefore, when setting the thread locality flag 151, 152, 153 or 154 OFF, thread 131, 132 or 133, for which object 121, 122, 123 or 124 has the thread locality, performs the locking process and the unlocking process that were not performed for object 121, 122, 123 or 124 (Step 503). After the locking status becomes consistent, the reference pointer of object 121, 122, 123 or 124 is substituted into another object (Step 504). Since, before object 121, 122, 123 or 124 loses the thread locality for thread 131, 132 or 133, the processing for obtaining consistency is performed by thread 131, 132 or 133, a problem, such as Racing, does not occur.

To perform the locking process and the unlocking process that are not performed at Step 503, it is necessary for the locking process and the unlocking process that were skipped to be identified when a request for a new access is issued. An arbitrary method for performing the identification can be employed. Two methods will be explained as examples.

The first method is a method that provides for the scanning of the execution stack of a thread for which a thread locality exists in order to identify a locking process and an unlocking process that were skipped. In this case, each time an object is referred to, the reference history is automatically stored in the execution stack of a thread. Therefore, there is no substantial process present for the processing (Step 305) in the flowchart in FIG. 3 that is accompanied by the skipping of the locking process, and the processing (Step 403) in the flowchart in FIG. 4 that is accompanied by the skipping of the unlocking process. However, when the thread locality of an object is lost, overhead is increased due to the need to scan the execution stack of the thread.

The second method is a method that provides for the counting of the number of times the locking process and the unlocking process were skipped, and for performing the skipped processes based on the count available at the time the thread locality of the object is lost. In this case, the process counts the number of times the process skipping was performed during the processing (Step 305) in the flowchart in FIG. 3, which is accompanied by the skipping of the locking process, and the processing (Step 403) in the flowchart in FIG. 4, which is accompanied by the skipping of the unlocking process. According to the second method, when the thread locality of an object is lost, there is no increase in overhead due to the scanning of the execution stack of the object. Since the load imposed by the counting process at Steps 305 and 403 is much lighter than that imposed by the locking process and the unlocking process that are skipped, the actual load imposed on the system can be reduced considerably.

As is described above, in a data processing environment wherein multiple threads share and access objects, there may be objects in the object pool that are not referred to by any threads. That is, threads create objects to execute various processes, and when the objects need not be referred to any longer and the reference pointers have been erased, these objects remain left in the object pool, even though they are unrelated to the program execution process. Therefore, it is important for the garbage collection process to be efficiently performed and for all unneeded objects to be removed so that the maximum usable space is available in the object pool.

Before collecting an unneeded object from the object pool, confirmation must be obtained that the pertinent object is not being referred to by any thread. Therefore, generally, whether the object in question is being referred to or not must be determined by tracing the reference pointers of all the threads.

In this embodiment, however, since a thread locality flag, indicating that a thread locality exists for a specific thread, is added to an object, if the thread locality flag of the object is ON, it is guaranteed that only the thread for which the thread locality exists can refer to the pertinent object. Therefore, to determine whether an object can be collected, the only examination that need be performed is one to ascertain whether a reference pointer to a pertinent object remains in a specific thread.

Figure 6:
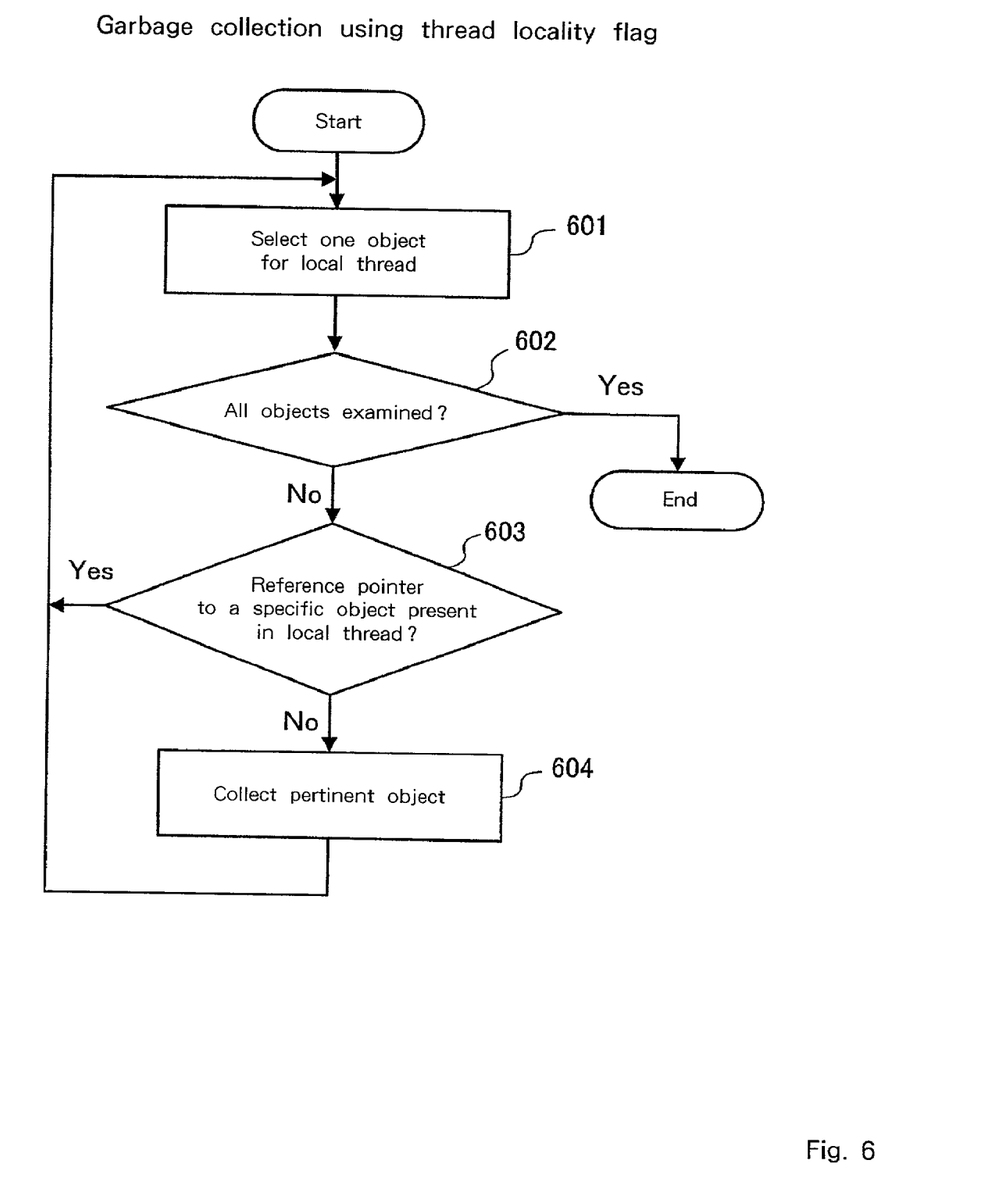
FIG. 6 is a flowchart for explaining the garbage collection processing using the thread locality flag in accordance with the embodiment.

FIG. 6 is a flowchart for explaining the garbage collection processing using a thread locality flag. In FIG. 6, a thread that is to execute the garbage collection process selects an object that has a thread locality for a specific thread (Step 601). The thread then determines whether a reference pointer to the object is present in the specific thread (Step 603). When no reference pointer is found, the object is collected (Step 604). This process is repeated until the thread has examined all the objects that have thread localities for the specific thread. The processing is thereafter terminated (Step 602).

Through this processing, an object that is not being referred to by a specific thread (i.e., not being referred to by any of the threads) can be collected from among the objects whose thread localities are ON. Since in this process the stack of a thread need only be scanned at one step to determine whether a predetermined object can be collected, and since the tracing of a reference pointer to the object is not required, garbage collection can be performed at an extremely high speed. Further, since a predetermined thread locally performs the garbage collection process, the normal processing performed by other threads need not be halted, and can be performed in parallel to the garbage collection.

In this embodiment, even when garbage collection using the thread locality flags is performed sequentially for the individual threads, an object whose thread locality flag is cleared and that is not being referred to by any of the threads can't be collected. To collect such an object, the conventional garbage collection method must be employed whereby the processing being performed by all the threads is temporarily halted, and the object pool is examined to find an object that is not referred to by any thread. That is, garbage collection for which the thread locality flag of this embodiment is employed can be used with the conventional garbage collection process.

As is described above, according to the present invention, the locking process is skipped when data is accessed that can be accessed by only one thread, and for which the probability is practically nil that an access request will be issued by other threads. Thus, the load imposed on the system is reduced and the overall system performance is improved. And since garbage collection can be performed in parallel to the normal processing, the efficiency of the garbage collection process is increased, and the deterioration of the overall system performance can be reduced.

What is claimed is:

1. A data processing system comprising:
   a processor;
   an interconnect;
   a system memory, coupled to the processor via the interconnect, wherein the system memory stores at least one object, the at least one object further includes:
   a thread locality flag that is set for indicating that the at least one object has been directly referred to by only a specific thread out of a plurality of threads issued from the processor; and
   a locking manager that performs a locking process on the at least one object only when the thread locality flag is not set and a thread out of the plurality of threads that is not the specific thread requests access to the at least one object.

2. The data processing system according to claim 1, further comprising:
   a garbage collector for removing the at least one object from the system memory only when the thread locality flag is set and the specific thread does not include a reference pointer to the at least one object.

3. The data processing system according to claim 1, further comprising:
   a thread locality manager for clearing the thread locality flag when the thread out of the plurality of threads that is not the specific thread requests access to the at least one object.

4. A computerized method comprising:
   receiving a request to access an object stored in a system memory by a first thread out of a plurality of threads issued by a processor coupled to the system memory;
   determining if a thread locality flag of the object is set wherein the thread locality flag is set only if the object has been directly referred to by only a specific thread out of the plurality of threads; and
   performing a locking process on the object only when the thread locality flag is not set and the first thread that is not the specific thread requests access to the object.

5. The method according to claim 4, further comprising:
   removing the object from the system memory only when the thread locality flag is set and the specific thread does not include a reference pointer to the object.

6. The method according to claim 4, further including:
   clearing the thread locality flag when the first thread is not the specific thread requests access to the object.

7. A computer program product having instruction stored in a tangible computer readable medium comprising:
  instructions, for receiving a request to access an object stored in a system memory by a first thread out of a plurality of threads issued by a processor coupled to the system memory;
  instructions, for determining if a thread locality flag of the object is set wherein the thread locality flag is set only if the object has been directly referred to by only a specific thread out of the plurality of threads; and
  instructions, for performing a locking process on the object only when the thread locality flag is not set and the first thread that is not the specific thread requests access to the object.

8. The computer program product according to claim 7, further comprising:
  instructions, for removing the object from the system memory only when the thread locality flag is set and the specific thread does not include a reference pointer to the object.

9. The computer program product according to claim 7, further comprising:
  instructions, for clearing the thread locality flag when the first thread is not the specific thread requests access to the object.

* * * * *